US00RE34007E

United States Patent [19]

Desenclos et al.

[11] E Patent Number: Re. 34,007

[45] Reissued Date of Patent: Jul. 28, 1992

[54] INDEXATION CONTROL DEVICE FOR A CYCLE DERAILLEUR

[75] Inventors: Christian Desenclos, L'Heure; Regis Sinoquet, Fressenneville, both of France

[73] Assignee: Sachs Industries S.A. (Huret et Millard reunis), Nanterre, France

[21] Appl. No.: 603,172

[22] Filed: Oct. 25, 1990

Related U.S. Patent Documents

Reissue of:

[64] Patent No.: 4,885,951
Issued: Dec. 12, 1989
Appl. No.: 123,963
Filed: Nov. 23, 1987

[30] Foreign Application Priority Data

Nov. 27, 1986 [FR] France ..... 86 16567

[51] Int. Cl.[5] ..... G05G 9/00

[52] U.S. Cl. ..... 74/502.2; 74/489; 74/523; 74/527

[58] Field of Search ..... 74/523, 475, 489, 502.2, 74/527

[56] References Cited

U.S. PATENT DOCUMENTS

| | | | |
|---|---|---|---|
| 2,620,672 | 12/1952 | McMahon | 74/527 |
| 4,548,092 | 10/1985 | Strong | 74/475 |
| 4,736,651 | 4/1988 | Nagano | 74/523 |
| 4,744,265 | 5/1988 | Nagano | 74/523 |
| 4,751,850 | 6/1988 | Nagano | 74/527 |
| 4,768,395 | 9/1988 | Tagawa | 74/527 |

FOREIGN PATENT DOCUMENTS

| | | |
|---|---|---|
| 157983 | 10/1985 | European Pat. Off. . |
| 2552569 | 3/1985 | France . |
| 2578507 | 9/1986 | France . |
| 2579163 | 9/1986 | France . |

*Primary Examiner*—Rodney M. Lindsey
*Assistant Examiner*—Flemming Saether
*Attorney, Agent, or Firm*—Trexler, Bushnell, Giangiorgi & Blackstone, Ltd.

[57] ABSTRACT

The device permits the control of a derailleur by means of a lever (9) with the use of indexation means which ensure a precise positioning of the lever in the various positions corresponding to the various gear ratios. It also permits the adjustment of the indexation pitch, so as to adapt it to freewheels having a different spacings or pitches between different sprocket pinions. For this purpose, positioning elements (19) may be shifted by a pitch selection element (21) so that the pitch between the various positions of the lever is modified.

10 Claims, 5 Drawing Sheets

XX
5
5a
23
26
27
24
24a
25
18
21
22
19
20
13
16
15
9
14
17
8
10
12
11
4
6
2
7
3
1

XX

X X
105
156
159
161
160
155
161a
157
163
158
109
162
153
154
150
112
107
102
101
X X

INDEXATION CONTROL DEVICE FOR A CYCLE DERAILLEUR

Matter enclosed in heavy brackets [ ] appears in the original patent but forms no part of this reissue specification; matter printed in italics indicates the additions made by reissue.

The present invention relates to control devices for cycle derailleurs.

Many control devices are known in the art for cycle derailleurs comprising a support adapted to be fixed to a part of the frame or the handlebar of the cycle and on which is rotatively mounted a control lever connected to an end of an actuating cable whose other end is connected to the derailleur.

Two main types of device exist, some being provided with friction means interposed between the lever and the support and adapted to immobilize the lever in the chosen position, and others being provided with indexation means between these elements. These indexation means comprise steps or like means which permit the precise determination of the different positions of the lever corresponding to the establishment of the different transmission ratios. These indexed positions are determined as a function of various parameters, and in particular of the pitch or space between the sprocket pinions of the freewheel, so that, when a freewheel is mounted whose pinions have a pitch different from that originally provided, the indexation means of such a control device cannot be used.

A third type of control device has therefore been proposed, which is a combination of the two aforementioned types. These devices permit the user to select as desired the operation of the lever, either with indexation of the various ratios or with friction.

This however has led to relatively complex assemblies and this complexity may result in lack of reliability and a relatively high cost.

The patent FR-A-2 585 796 (SHIMANO) having a priority date which is prior to the filing date of the present application but published after said filing date, describes a control device for a cycle derailleur comprising adjusting means for adapting the indexation means when it is desired to replace a freewheel having for example six sprocket pinions by a freewheel having seven pinions. The indexation means comprise, for this purpose, a series of six engagement portions and a series of seven engagement portions, respectively corresponding to the numbers of pinions of the two different freewheels. The adjusting means afford the possibility of choosing either one of the series of engagement portions. However, this device lacks flexibility since it does not cope with the case where the axial distances between the sprocket pinions differ from one freewheel to another.

An object of the invention is therefore to solve the aforementioned problems by proposing a control device for cycle derailleurs which is simple, reliable, of low cost price and easily adaptable to freewheels having different distances or pitches between the sprocket pinions constituting said freewheels.

For this purpose, the invention provides a control device for a cycle derailleur, comprising a support adapted to be fixed to a part of the frame or of the handlebar of the cycle, a lever for shifting an actuating cable of the derailleur, movable in rotation about an axis relative to said support, indexation means between the lever and the support, and means for adjusting the indexation means, wherein the adjusting means define a variable pitch between two successive positions of the indexation means.

According to a particular feature of the invention, the indexation means comprise an element connected to the lever and provided with at least one series of recesses cooperative with a positioning element carried by a fixed member connected to the support and the means for adjusting the variable pitch of the indexation means comprise said element connected to the lever whose recesses are constituted by grooves or slots which define therebetween pitches of a value which varies along their length, the fixed member connected to the support in which each positioning element is movably mounted for occupying in the grooves or slots of the element connected to the lever positions corresponding to the desired indexation pitch, and an element for shifting said positioning elements in the fixed member connected to the support.

A better understanding of the invention will be had from the following description which is given solely by way of example with reference to the accompanying drawings, in which.

Figures 1, 2:
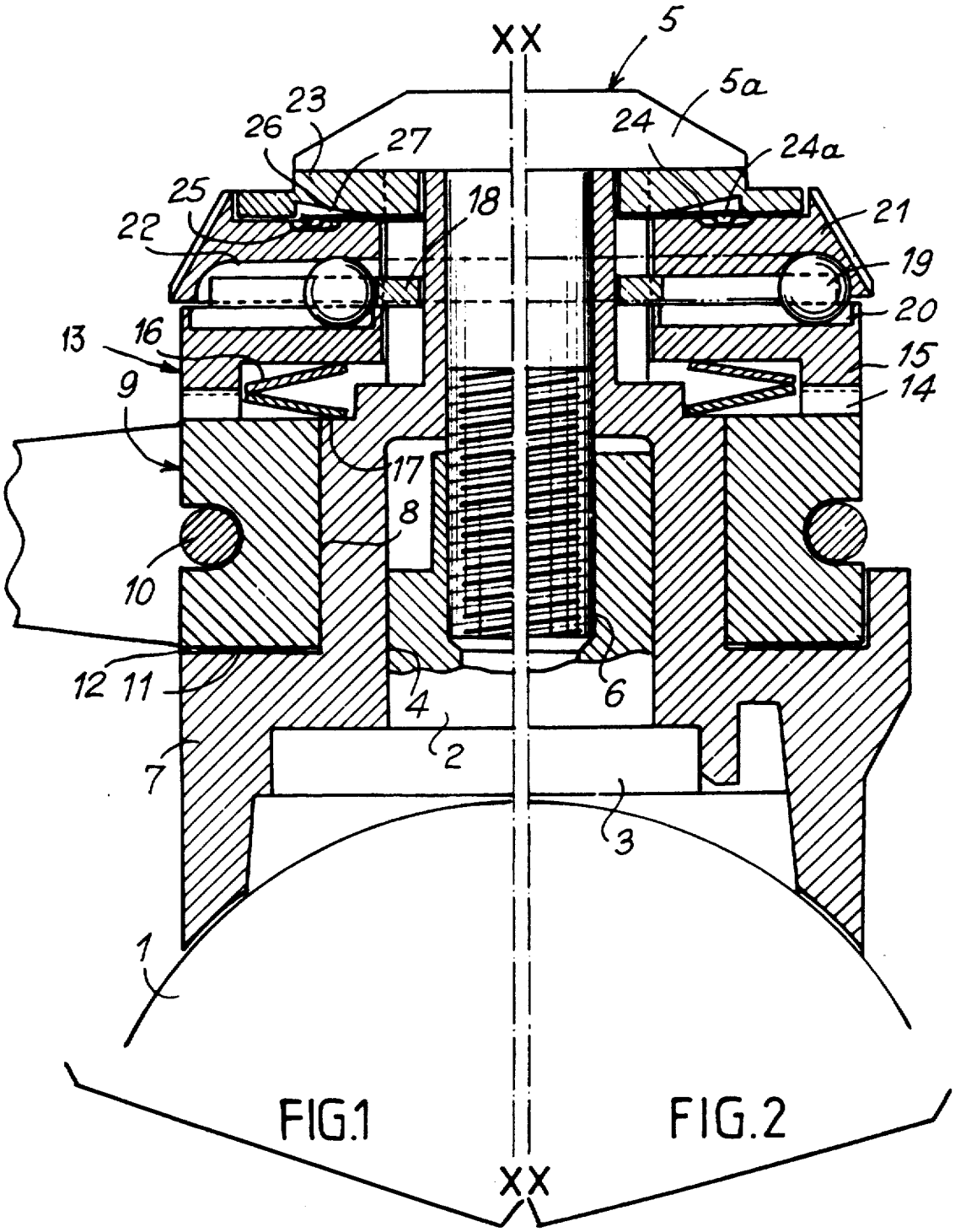
FIG. 1 is a diagrammatic semi-axial sectional view of an indexation control device according to the invention.
FIG. 2 is also a diagrammatic semi-axial sectional view of the device in a position of operation adapted for a different freewheel.

FIGS. 1 and 2 show a part of a tube 1 of a frame or handlebar of a cycle. Fixed on this tube by any suitable means is a support which, in the illustrated embodiment, is constituted by a stud 2 brazed to the tube and including a square base 3 and a cylindrical portion 4 optionally provided with flat faces.

Fixed on this stud by means of a screw 5 cooperating with an internal screw thread 6 of the stud is an intermediate element 7 which constitutes a kind of adapter between the support constituted by the brazed stud and the rest of the device. This intermediate element matches at its base the shape of the tube and defines a cylindrical outer surface 8 acting as a guide for a lever 9. The latter, which is only partly shown in the drawing, is constituted, in the known manner, by an arm mounted to be rotatable about the axis X—X of the stud 2 and to which there is hooked the end of a derailleur-actuating cable 10. The element 7 defines a radial surface 11 perpendicular to the axis X—X constituting a bearing surface for a washer 12 interposed between the lever 9 and the adapter 7.

The device shown in FIGS. 1 and 2 further comprises an indexation element in the form of a washer 13 driven in rotation by the lever 9 through axial teeth 14 on the latter permanently engaged with complementary axial teeth 15 on the washer 13. This washer 13 is axially movably mounted on the adapter 7 and is biased by elastically yieldable washers 16 of the Belleville type interposed between the lever 9 and the washer 13 and bearing against one of the sides of the washer 13 and against a shoulder 17 of the adapter 7. The other side of the indexation washer 13 is in contact with the washer 18 fixed on the adapter 7. The washer 18 serves to house and guide two positioning elements in the form of balls 19 which are mounted in the washer in diametrically opposed relation to each other. The side of the washer 13 opposed to the side including the teeth 15 is provided with two series of recesses 20 which are diametrically opposed in pairs and capable of partly receiving the balls 19. A pitch selecting washer 21 is rotatively mounted on the adapter 7 in confronting relation to the fixed washer 18. The selection washer 21 is provided with two recesses 22 capable of partly receiving the two balls 19. A locking washer 23 is fixed on the adapter 7 between the selection washer 21 and the head 5a of the screw 5. A thin washer 24, for example of spring steel, is interposed between the selection washer 21 and the washer 23 locking and is fixed in rotation and carried two diametrically opposed locking elements 24a each constituted by a strip provided with a retractable lug 25 cooperating with recesses 26 in the selection washer 21. Moreover, the locking washer 23 is provided, for each strip, with a recess 27 in which is retractable the corresponding strip 24a with its lug 25 when they are shifted between the recesses 26.

Figure 5:
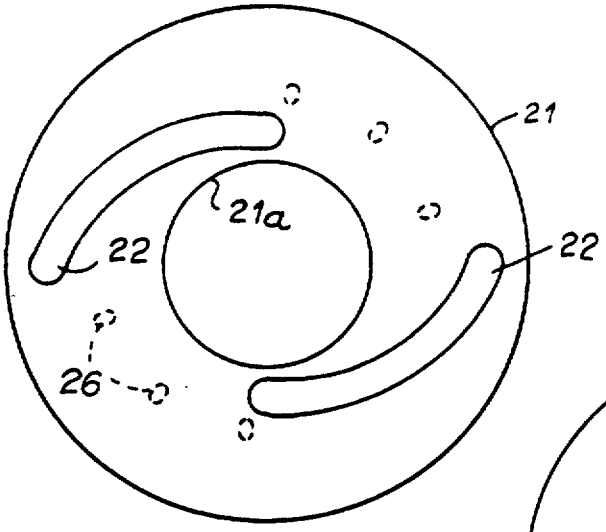
FIGS. 3a, 3b, 4 and 5 are plan views respectively representing three of the parts forming part of the construction of the device shown in FIGS. 1 and 2.
Figure 3A:
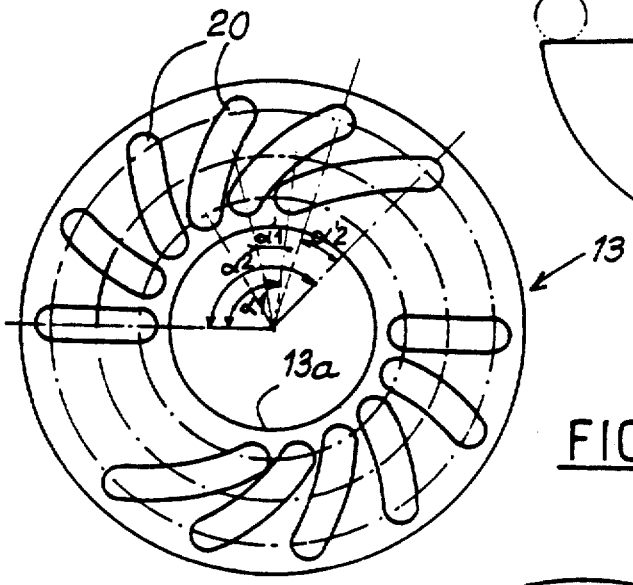

The indexation means and the pitch selecting means are illustrated in more detail in the plan views of FIGS. 3a and 5. FIG. 3a shows the indexation washer 13 having a central aperture 13a for rotatively mounting it on the adapter 7. This washer is provided, on one of its sides, with its teeth 15 (FIG. 1) and, on the other side, with two series of recesses 20 in the form of divergent grooves diametrically opposed in pairs. The grooves of each series extend from points evenly spaced apart on a portion of a small circle of the washer close to its central aperture 13a. The first groove 20 of each series is rectilinear and radial. The other grooves 20A, 20B, 20C of each series are curvilinear and each extend in such manner as to be progressively spaced away from a diameter of the washer 13 which passes through their corresponding departure point.

Said spacings of the grooves from the diameter of the washer 13 passing through their departure point are such that the pitch from one groove to the other is always well defined if a circle of the washer is considered, but increases along the length of the grooves. This means that the pitch between two successive grooves 20 progressively increases when moving from the inner edge of the washer toward its periphery.

Figure 4:
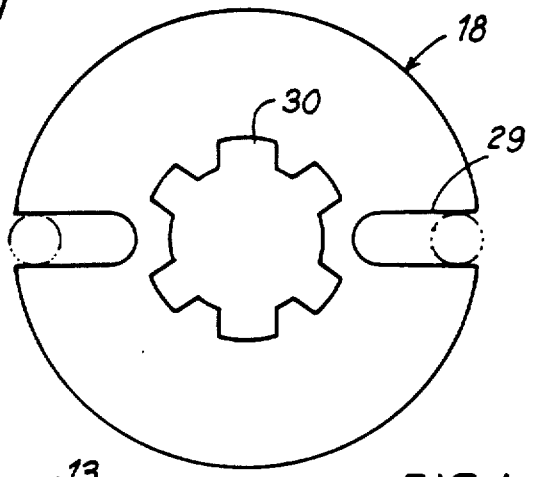

FIG. 4 shows the washer 18 which serves to guide the two balls 19. For this purpose this washer has diametrically opposed rectilinear radial slots 29 for guiding the balls from one position to another along their length. The washer 18 is mounted in a fixed position on the adapter 7 by a central splined aperture 30.

FIG. 5 shows the selection washer 21 provided with a central aperture 21a for rotatively mounting it on the adapter 7. The washer 21 is provided, as mentioned before, with two recesses 22 in the form of diametrically opposed curved grooves extending symmetrically with respect to each other from diametrically opposed points on a small circle of the washer toward diametrically opposed points in a circle of larger diameter. These grooves define the path of the balls when selecting the indexation pitch. The selection washer 21 is provided, on its other side, with hollows 26 evenly spaced apart on a portion of a small circle of the washer and adapted to receive the respective lugs 25 of the interposed washer 24. These hollows also serve to ensure the selection of the indexation pitches and their number, which includes two groups of three hollows in the presently-described example, corresponds to the number of possible different pitches, and therefore also to the number of positions of the balls 19 along the length of the grooves 20 of the indexation washer 13.

Figure 3B:
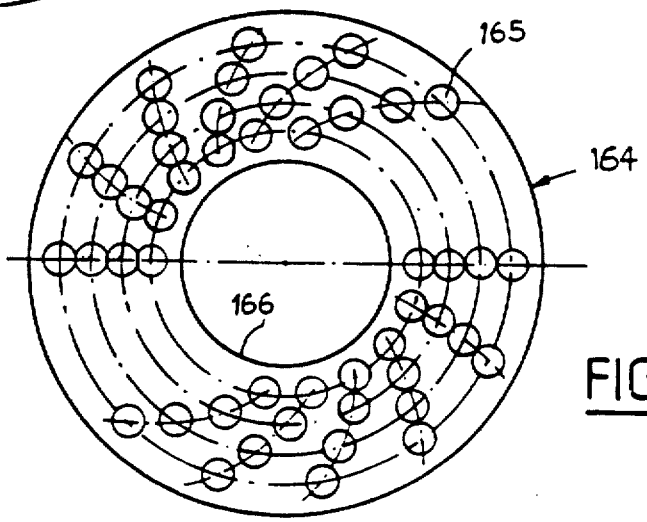

According to a variant of the invention, shown in FIG. 3b, the indexation washer 164 is provided, on one of its sides, with a series of separate indents 165 instead of the grooves according to the embodiment described hereinbefore. These series of indents 165 are disposed on lines which extend in a manner similar to said grooves and the indents are located at points of intersection between these lines and concentric circles of the indexation washer 164 indicating the different indexation pitches. The indexation washer 164 moreover includes a central aperture for rotatively mounting it on the adapter 7.

This embodiment is advantageous in that it is possible to eliminate the rotation locking means 23, 24, 25, 26, 27, since, in this case, the indexation pitch is indicated by the engagement of each of the balls in a corresponding indent of a series, which also ensures the immobilization of the selection washer 21 against rotation in the angular position corresponding to the chosen indexation pitch.

Species A operates in the following manner: in the position shown in FIG. 1, the balls 19 are in their inner end position. This position of the balls 19 corresponds to the minimum pitch of the indexation pitch and therefore to a certain minimum distance between the sprocket pinions of the freewheel. For the purpose of changing speed, the lever 9 is turned and this also rotates the indexation washer 13 which is connected to rotate with the lever through the teeth 14 and 15. The balls 19 engaged and guided in the slots 29 of the fixed washer 18 bear in diametrically opposed grooves of the indexation washer 13 corresponding to a chosen speed. The balls are moreover guided in the grooves 22 of the selection washer 21 and are retained by the bottoms of the grooves of the washer 21 when the lever 9 is turned with the washer 13. Consequently, the ball 19 exerts a force on the indexation washer 13 which is axially displaced in opposition to the action of the Belleville washers 16 in order to permit the jumping of the balls 19 from one pair of grooves 20 of the indexation washer 13 to the following pair corresponding to a different speed.

There has just been described hereinbefore the operation of the indexation means, i.e. the speed changing means. There will now be described the operation of the selection means for modifying the pitch between the different indexed positions of the lever 9 in accordance wheel which is desired to be adapted on a rear wheel of a bicycle. Indeed, a freewheel, for example having five sprocket pinions, has gaps between the pinions which are different from those having four or six sprocket pinions. If it is desired to change from a freewheel having six sprocket pinions to a freewheel having five sprocket pinions, the pitch of indexation of the lever must therefore be modified accordingly.

This modification of the indexation pitch is achieved in the following manner. It will be assumed that the end position of the balls 19 at the end of the slots 29 of the fixed washer 18 defines an indexation pitch corresponding to an initial freewheel having six sprocket pinions. The grooves 20 of the indexation washer 13 each correspond to a speed or a sprocket pinion of the freewheel.

If it is now desired to change to a freewheel provided for example with five sprocket pinions the indexation pitch is also changed so that it corresponds to the axial distance between the sprocket pinions of the freewheel having five pinions. This modification of the pitch is achieved by turning the selection washer 21 in the counter-clockwise direction so that the lugs 25 of the interposed washer 24 pass from the hollows 26 they occupy for defining the indexation pitch for the freewheel having six sprocket pinions to the hollows 26 indicating a freewheel having five sprocket pinions. This rotation of the washer 21 causes the balls 19 driven by the eccentric grooves 22 of the selection washer 21 and guided by the slots 29 of the fixed washer 18 to be shifted. The balls 19 are thus shifted in their grooves 20 of the indexation washer 13 from a position on a small circle toward a position on a circle of larger diameter of this washer corresponding to a new desired pitch.

The shifting of the balls 19 is facilitated by previously placing the lever 9 in abutment in its initial end position in which the balls 19 are located in the rectilinear and radial grooves 20.

In the embodiment just described there is obtained for the lever 9 a total shifting angle which is a function of the chosen indexation pitch. It can be seen in FIG. 3 that this angle may vary between a minimum angle $\alpha_1$ corresponding to the position of the balls 19 in the grooves 20 the closest to the center of the washer and the maximum angle $\alpha_2$ corresponding to the position of the balls the most remote from the center.

Consequently, the angle of rotation of the lever for shifting the balls 19 from one groove 20 to the following will vary in a corresponding manner. For example, it can be seen in FIG. 3a that the angle $\alpha_1$ of the passage from the last but one groove 20 to the last groove corresponding to the position of the balls 19 which is the closest to the center of the washer, is less than the angle of passage $\alpha_2$ corresponding to the position of the balls the most remote from the center.

Figures 6, 7:
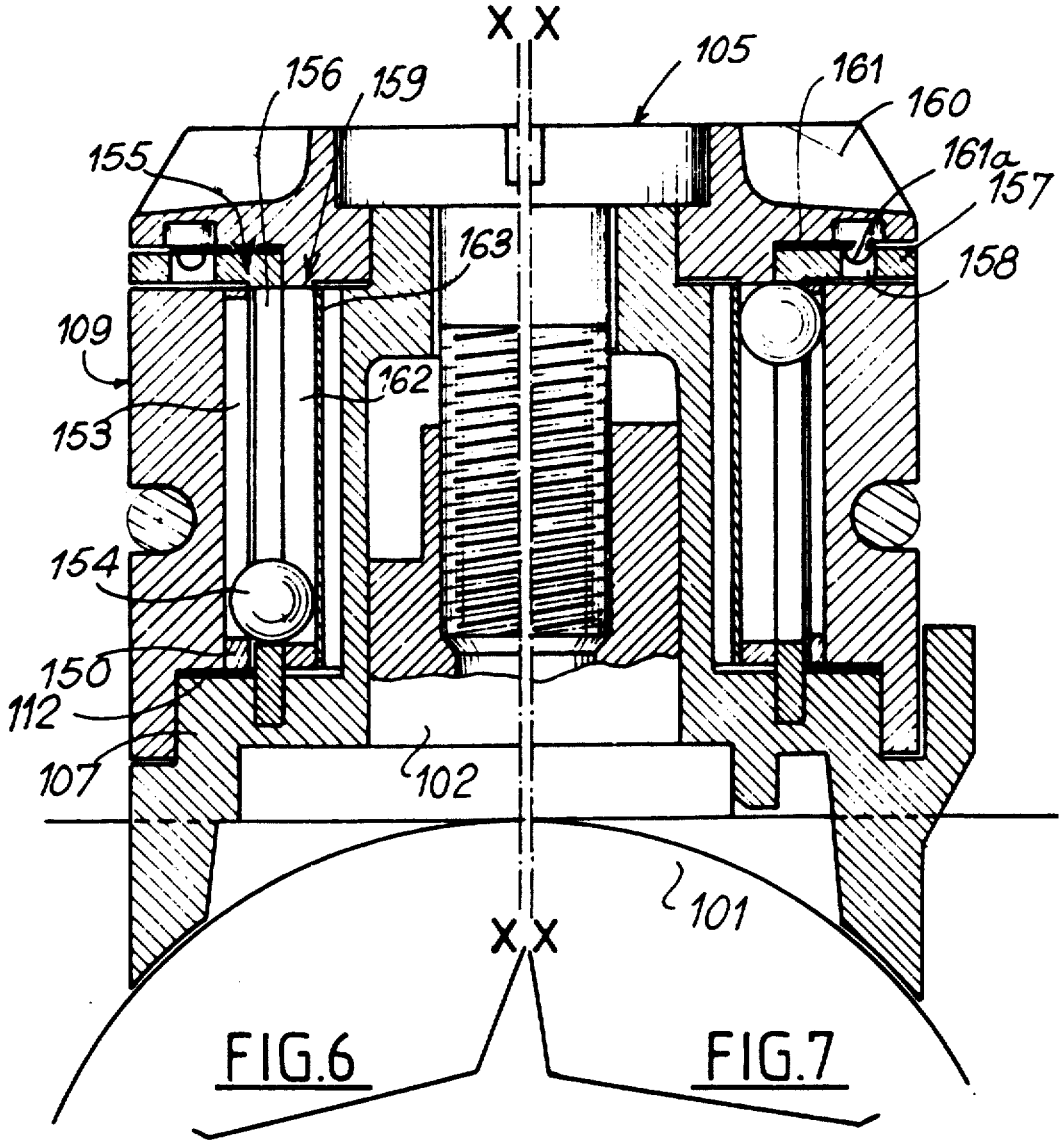
FIGS. 6 and 7 are two semi-axial sectional views of a variant of the device in two positions of operation adapted for two different freewheels.
Figure 8:
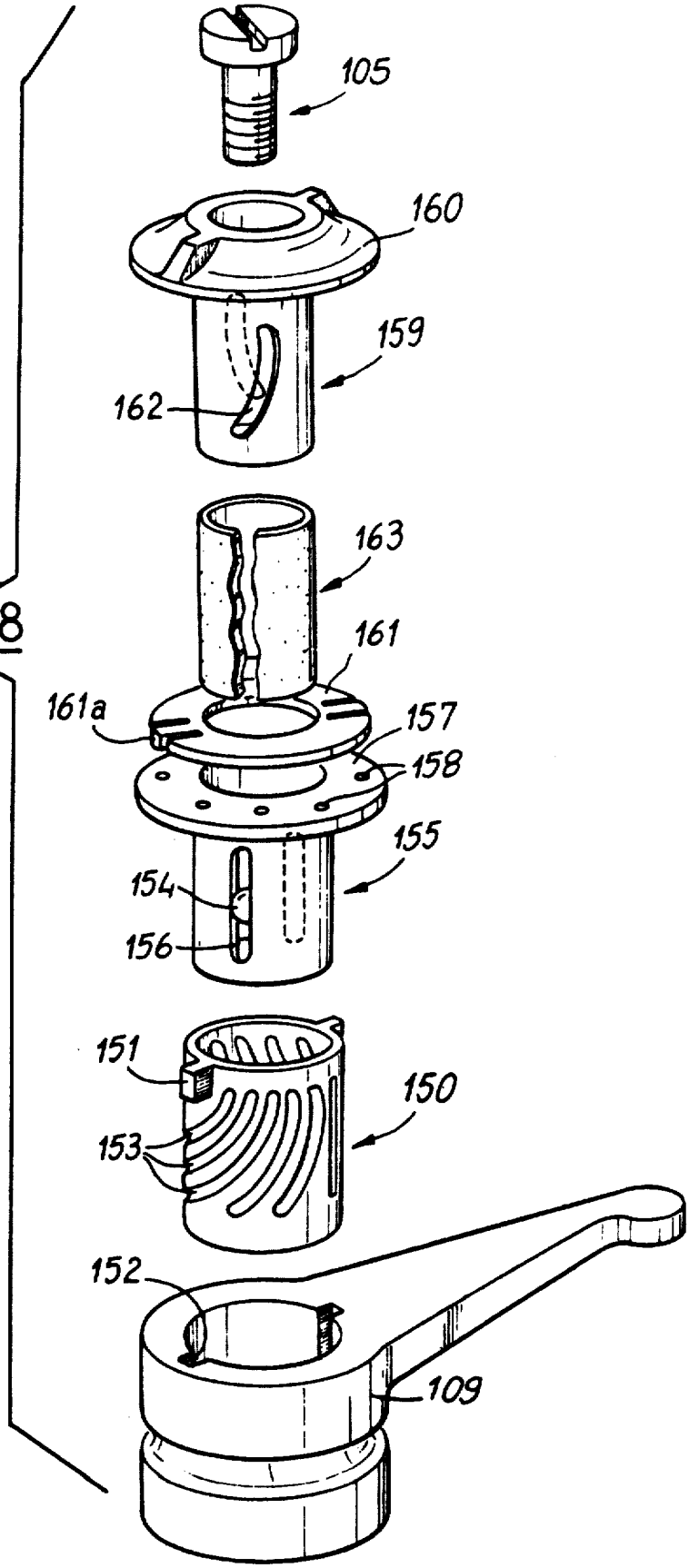
FIG. 8 is a perspective exploded view of the essential parts which are part of the construction of the device shown in FIGS. 6 and 7.
Figure 8A:
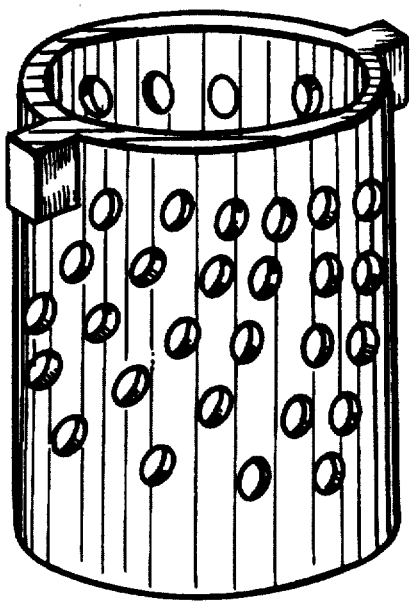
FIG. 8a is a perspective view representing a part encompassed in a different embodiment of FIG. 8.

FIGS. 6 and 8 show a variant of the embodiment according to the invention. In this variant, the elements corresponding to those of the first embodiment are designated by the same reference numerals increased by 100. As can be seen in FIGS. 6, 7 and 8, the indexation means and the indexation pitch adjusting means are constituted by essentially cylindrical elements.

The indexation means comprise an indexation element in the shape of a sleeve 150 mounted on an adapter 107 by means of a friction washer 112 and engaged in a lever 109. It is driven in rotation by the ever through two diametrically opposed lugs 151 disposed on the periphery of the sleeve 150 and located in recesses 152 of the lever 109.

The indexation sleeve 150 is moreover provided on its lateral surface with two series of recesses in the form of slots 153 which are diametrically opposed in pairs The first slot is rectilinear and the others curvilinear. The first ends of the slots 153 of each series of slots are located on a large circle of the sleeve close to one of the edges of the latter and are located at even distances apart from each other. The slots 153 extend in a divergent manner toward another large circle of the sleeve close to the other edge of the latter so that the distances between the slots, considered on the large successive intermediate circles, are equal to each other, but increasing.

The slots 153 of the indexation sleeve 150 receive partly positioning means in the form of balls 154 engaged and guided in a fixed sleeve 155 engaged in the indexation sleeve 150 by two rectilinear axial slots 156 which are diametrically opposed and provided in said sleeve 155. The sleeve 155 is provided at one of its ends with a flange 157 including indents 158 which are diametrically opposed in pairs and are part of the pitch selection means.

The indexation pitch selection means further comprise a selection sleeve 159 provided with a wing head 160. The sleeve 159 is so mounted that its cylindrical portion is within the fixed sleeve 155 and the lower portion of its head 160 bears against the flange 157 of the sleeve 155. The indexation pitch selection sleeve 159 receives an interposed washer 161 provided with two diametrically opposed lugs 161a which cooperates with the indents 158 of the flange 157 for indicating the different indexation pitches.

The indexation pitch selection sleeve is further provided with two diametrically opposed helical slots 162 for axially driving the balls 154 which partly receive the balls 154 and whose width is sufficient to enable these balls 154 to move slightly in the radial direction.

A sheath 163 having an elasticity yieldable wall is mounted between the indexation pitch section sleeve 159 and the adapter 107. This sheath 163 may be compressed by the balls 154 when the latter are biased radially inwardly.

All of the parts which constitute the indexation means and the pitch selection means are fixed to the stud 102 which is rendered rigid with the frame 101 by a screw 105.

The operation of the device which has been described is as follows. For changing speed, the lever 109 is turned and this also turns the indexation sleeve 150. Consequently, the balls 154 are radially inwardly biased by the edges of the slots 153 of the indexation sleeve 150 They move while slightly compressing the sheath 163 and, under the action of the return force exerted by elastically yieldable wall of this sheath, resume their initial radial position when they are in front of the slots 153 corresponding to the following speed.

For the purpose of modifying the indexation pitch when it is desired to change from a freewheel having, for example, five sprocket pinions to another freewheel having for example six pinions, the lever 109 is first put in its starting end angular position of abutment in which the balls 154 engage in the rectilinear slots of each series of slots 153 of the indexation sleeve 150. The selection sleeve 159 is then turned in the clockwise direction until the lugs 161a of the interposed washer 161 which were initially in the indents 158 indicating the indexation pitch for a freewheel having five sprocket pinions, engage in the indents 158 of the flange 157 of the fixed sleeve 155. This rotation of the sleeve 159 causes the axial displacement of the balls 154 in the slots 156 of the fixed sleeve 155 under the action of the helical slots 162 of the selection sleeve 159 until they occupy in the slots 153 of the indexation sleeve 150 the desired position corresponding to a reduced indexation pitch adapted to a freewheel having six sprocket pinions.

According to a variant of the invention (not shown in the drawings) the indexation sleeve 150 may have, instead of slots 153, groups of separate orifices, these groups being formed by groups of orifices disposed on lines which extend in a manner similar to the slots 153 of the selection sleeve 150. The orifices of each group corresponding to the various indexation pitches are located at the points of intersection between these lines and large circles of the indexation sleeve 150 which represent these various pitches.

This embodiment is advantageous in that it is possible to eliminate the interposed washer 161 provided with its lugs 161a and the indents 158 on the flange 157 of the sleeve 155, since the engagement of the balls in the successive orifices along said lines also achieves the immobilization in rotation of the selection sleeve in the angular position corresponding to the chosen indexation pitch. To ensure the selection of the indexation pitch under good conditions, it is necessary to place the lever of the control device, before proceeding to this selection, in its end position in which the balls are each located in front of a series of orifices on the indexation sleeve aligned axially.

Although in the embodiment described with reference to FIGS. 1 to 5, the indexation washer 13 has outwardly divergent grooves 20, it is also possible to arrange these grooves to be divergent toward the center of this washer, in which case the position of the balls which is the closest to the center of the indexation washer would correspond to maximum distances or pitches between the sprocket pinions.

Furthermore, the grooves 20 of the indexation washer 13 may all be rectilinear and disposed with respect to one another at suitable angles.

It would be understood that in the case of grooves 20 which diverge toward the center of the indexation washer 13, the pitches obtained would be progressively decreasing from the center of the washer 13 towards its periphery.

The embodiments described hereinbefore all permit a modification of the indexation pitch of a derailleur control device for the purpose of adapting it to different freewheels.

What is claimed is:

1. A control device for a cycle derailleur comprising a support for fixing to a part of the frame or handlebar of the cycle, a lever for shifting an actuating cable of the derailleur and mounted to be rotatable about an axis relative to said support, indexation means located between the lever and the support, and adjusting means associated with the indexation means for defining a variable pitch between two successive positions of the indexation means, the indexation means comprising a fixed member connected to the support, a first annular element connected to rotate with the lever and provided with at least one series of recesses, a positioning element carried by the fixed member and cooperative with said recesses, the adjusting means comprising said first annular element whose recesses each of which is disposed along a recess line, said recesses defining therebetween pitches of a value which varies along the length of the lines, said positioning element being movably mounted on said fixed member for being selectively positioned along said recess lines in the recesses of said first annular element at positions corresponding to the desired indexation pitch, and a second annular element for shifting said positioning element relative to the fixed member, said recess lines disposed on the first annular element comprising a first rectilinear line, the other recess lines being curved lines.

2. A device according to claim 1, wherein said first annular element being constituted by an indexation washer comprising on a first side thereof two series of said recesses disposed on divergent recess lines diametrically opposed in pairs, each for receiving one of said positioning elements which are in the form of balls, wherein the indexation washer comprises on a side of the indexation washer opposed to said first side, first axial teeth, said lever including second axial teeth engaged with said first axial teeth, elastically yieldable means interposed between the support and the indexation washer for biasing the indexation washer against said second annular element, the balls being thus maintained between the indexation washer and said second annular element.

3. A device according to claim 2, wherein said recess lines on which the series of recesses are disposed are divergent radially outwardly on the indexation washer.

4. A device according to claim 2, wherein said recess lines on which the series of recesses are disposed are divergent radially inwardly on the indexation washer.

5. A device according to any one of claims 2 or 3, wherein said recesses of the first annular element are constituted by groups of separate indents disposed on said divergent recess lines of said first annular element, whereby said indents ensure directly, in combination with the balls, the immobilization of the selection element in the angular position corresponding to the chosen pitch.

6. A device according to claim 1, wherein said first annular elment is constituted by an indexation sleeve comprising on a lateral surface thereof, two series of said recesses disposed on divergent lines diametrically opposed in pairs, for receiving two of said positioning elements in the form of two balls, the indexation sleeve being engaged in the lever and connected to rotate with the lever, said fixed member being constituted by a fixed sleeve and comprising two diametrically opposed axial slots guidingly engaged with the balls, the indexation sleeve surrounding the fixed sleeve, said second element being constituted by a selection sleeve rotatively mounted in said fixed sleeve and comprising diametrically opposed helical slots drivingly engaged with the balls maintained in the axial slots of the fixed sleeve by a sheath having an elastically yieldable wall mounted within the selection sleeve and in engagement with the two balls for applying the balls against the recesses of the indexation sleeve through the helical slots of the selection sleeve and the axial slots of the fixed sleeve.

7. A device according to claim 6, comprising a flange on the fixed sleeve, indents in the flange for determining the indexation pitch on the selection sleeve, an inserted washer interposed between the head and the flange and comprising diametrically opposed lugs cooperative with said indents in the flange.

8. A device according to any one of claims 2, 3, or 6, wherein the recesses of the first annular element are constituted by groups of separate orifices disposed on said divergent recess lines of said first annular element, whereby said orifices ensure directly, in combination with the balls, the immobilization of the selection element in the angular position corresponding to the chosen pitch.

9. A device according to any one of claims 2, 3, or 6, wherein said recesses of the first annular element are constituted by grooves extending along said divergent lines of said first annular element.

10. A device according to any one of the claims 2, 3, or 6, wherein said recesses of the first annular element are constituted by slots extending along said divergent lines of said first annular element.

* * * * *